US010242182B2

(12) United States Patent
Kargman et al.

(10) Patent No.: US 10,242,182 B2
(45) Date of Patent: *Mar. 26, 2019

(54) COMPUTER SECURITY SYSTEM AND METHOD

(71) Applicant: SECURE VECTOR, LLC, Chicago, IL (US)

(72) Inventors: James B. Kargman, Chicago, IL (US); Peter Scott, Boulder, CO (US); Jeffrey Bromberger, Omaha, NE (US)

(73) Assignee: SECURE VECTOR, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,759

(22) Filed: Jun. 27, 2017

(65) Prior Publication Data
US 2017/0293755 A1    Oct. 12, 2017

Related U.S. Application Data

(63) Continuation-in-part of application No. 15/276,494, filed on Sep. 26, 2016, now abandoned, which is a
(Continued)

(51) Int. Cl.
*G06F 21/00*    (2013.01)
*G06F 21/53*    (2013.01)
(Continued)

(52) U.S. Cl.
CPC ............ *G06F 21/53* (2013.01); *G06F 21/554* (2013.01); *G06F 21/56* (2013.01); *G06F 21/6218* (2013.01)

(58) Field of Classification Search
CPC ........ G06F 21/10; G06F 21/53; G06F 21/556; G06F 21/126; G06F 21/74; G06F 21/56; G06F 21/6218; G06F 21/554
See application file for complete search history.

(56) References Cited

U.S. PATENT DOCUMENTS 5,317,717 A    5/1994 Cutler et al.
6,279,111 B1   8/2001 Jensenworth et al.
(Continued)

FOREIGN PATENT DOCUMENTS

WO    WO-2004057434 A3    9/2004

OTHER PUBLICATIONS

"U.S. Appl. No. 12/911,184, Final Office Action dated Aug. 1, 2012", 34 pgs.
(Continued)

*Primary Examiner* — Don G Zhao
(74) *Attorney, Agent, or Firm* — Drinker Biddle & Reath LLP

(57) ABSTRACT

A method is provided for protecting a computer system, comprising creating an isolated process, then assigning a first process group to the process; creating an additional group process within the first process group; performing a first determination by an application programming interface (API) that the additional group process is within the first process group, and as a result of the first determination, causing the additional group process to inherit and duplicate a handle of the process. Process communications and control within isolated groups is permitted freely, whereas process control by an isolated process for non-isolated processes or isolated processes in different groups is constrained or prohibited.

9 Claims, 8 Drawing Sheets

Related U.S. Application Data continuation of application No. 14/325,301, filed on Jul. 7, 2014, now Pat. No. 9,454,652, which is a continuation-in-part of application No. 13/867,447, filed on Apr. 22, 2013, now Pat. No. 8,775,802, which is a continuation-in-part of application No. 12/911,184, filed on Oct. 25, 2010, now Pat. No. 8,429,429.

(60) Provisional application No. 61/254,432, filed on Oct. 23, 2009.

(51) Int. Cl.
 *G06F 21/55* (2013.01)
 *G06F 21/62* (2013.01)
 *G06F 21/56* (2013.01)

(56) References Cited

U.S. PATENT DOCUMENTS

| | | | |
|---|---|---|---|
| 6,349,355 B1 | 2/2002 | Draves et al. | |
| 6,507,904 B1 | 1/2003 | Ellison et al. | |
| 6,633,963 B1 | 10/2003 | Ellison et al. | |
| 6,678,825 B1 | 1/2004 | Ellison et al. | |
| 6,754,815 B1 | 6/2004 | Ellison et al. | |
| 6,760,441 B1 | 7/2004 | Ellison et al. | |
| 6,934,817 B2 | 8/2005 | Ellison et al. | |
| 6,941,458 B1 | 9/2005 | Ellison et al. | |
| 6,957,332 B1 | 10/2005 | Ellison et al. | |
| 7,137,004 B2 | 11/2006 | England et al. | |
| 7,392,541 B2 | 6/2008 | Largman et al. | |
| 7,398,532 B1 | 7/2008 | Barber et al. | |
| 7,506,170 B2 | 3/2009 | Finnegan | |
| 7,665,143 B2 | 2/2010 | Havens et al. | |
| 7,809,957 B2 | 10/2010 | Grawrock | |
| 7,979,889 B2 * | 7/2011 | Gladstone | G06F 21/52 726/1 |
| 8,024,815 B2 * | 9/2011 | Lorch | H04N 21/4435 726/29 |
| 8,099,596 B1 | 1/2012 | Rusakov et al. | |
| 8,191,167 B2 * | 5/2012 | Frerebeau | H04L 63/0853 713/187 |
| 8,225,404 B2 | 7/2012 | Freericks et al. | |
| 8,381,288 B2 * | 2/2013 | Sahita | G06F 12/145 711/154 |
| 8,429,429 B1 | 4/2013 | Kargman et al. | |
| 8,775,802 B1 * | 7/2014 | Kargman | G06F 21/556 713/166 |
| 9,454,652 B2 | 9/2016 | Kargman et al. | |
| 2001/0037450 A1 * | 11/2001 | Metlitski | G06F 12/1408 713/152 |
| 2003/0159070 A1 | 8/2003 | Mayer et al. | |
| 2004/0078590 A1 | 4/2004 | Ellison et al. | |
| 2004/0093506 A1 | 5/2004 | Grawrock et al. | |
| 2005/0149726 A1 * | 7/2005 | Joshi | G06F 21/51 713/164 |
| 2005/0229250 A1 | 10/2005 | Ring et al. | |
| 2006/0107328 A1 | 5/2006 | Frank et al. | |
| 2006/0259487 A1 * | 11/2006 | Havens | G06F 21/51 |
| 2006/0282606 A1 * | 12/2006 | Radhakrishnan | G06F 9/45537 711/6 |
| 2007/0033420 A1 | 2/2007 | Sherwani et al. | |
| 2007/0079090 A1 * | 4/2007 | Rajagopal | G06F 12/1491 711/163 |
| 2007/0094495 A1 | 4/2007 | Hunt et al. | |
| 2008/0127355 A1 | 5/2008 | Lorch et al. | |
| 2008/0250400 A1 * | 10/2008 | Vertes | G06F 9/4486 717/158 |
| 2009/0063869 A1 | 3/2009 | Kohavi et al. | |
| 2009/0150824 A1 * | 6/2009 | Furuichi | G06F 3/0481 715/803 |
| 2010/0024036 A1 * | 1/2010 | Morozov | G06F 21/53 726/26 |
| 2010/0057774 A1 * | 3/2010 | Pizano | G06F 21/53 707/E17.055 |
| 2017/0011218 A1 * | 1/2017 | Kargman | G06F 21/126 |

OTHER PUBLICATIONS

"U.S. Appl. No. 12/911,184, Non Final Office Action dated Apr. 5, 2012", 33 pgs.

"U.S. Appl. No. 12/911,184, Notice of Allowance dated Dec. 20, 2012", 13 pgs.

"U.S. Appl. No. 12/911,184, Response filed Jul. 5, 2012 to Non Final Office Action dated Apr. 5, 2012", 12 pgs.

"U.S. Appl. No. 12/911,184, Response filed Nov. 1, 2012 to Final Office Action dated Aug. 1, 2012", 13 pgs.

"U.S. Appl. No. 13/867,447, Non Final Office Action dated Oct. 15, 2013", 18 pgs.

"U.S. Appl. No. 13/867,447, Notice of Allowance dated Feb. 27, 2014", 5 pgs.

"U.S. Appl. No. 13/867,447, Response filed Jan. 15, 2014 to Non Final Office Action dated Oct. 15, 2013", 9 pgs.

"U.S. Appl. No. 14/325,301, Final Office Action dated Apr. 14, 2016", 17 pgs.

"U.S. Appl. No. 14/325,301, Non Final Office Action dated Jul. 21, 2015", 12 pgs.

"U.S. Appl. No. 14/325,301, Notice of Allowance dated Jun. 7, 2016", 11 pgs.

"U.S. Appl. No. 14/325,301, Response filed Jan. 20, 2016 to Non Final Office Action dated Jul. 21, 2015", 7 pgs.

"U.S. Appl. No. 14/325,301, Response filed May 16, 2016 to Final Office Action dated Apr. 14, 2016", 8 pgs.

"U.S. Appl. No. 15/276,494, Non Final Office Action dated Jan. 27, 2017", 16 pgs.

"International Application Serial No. PCT/US2015/039213, International Search Report dated Oct. 16, 2015", 2 pgs.

"International Application Serial No. PCT/US2015/039213, Written Opinion dated Oct. 16, 2015", 4 pgs.

"Kernel Parch Protection", Wikipedia, the free encyclopedia, [Online] retrieved from the internet: <http://en.wikipedia.org/wiki/Kernel_Patch_Protection>, (Oct. 13, 2010), 6 pgs.

"Sandbox (computer security)", Wikipedia, the free encyclopedia, [Online] retrieved from the Internet: <http://en.wikipedia.org/wiki/Sandbox_(computer_security)>, (Apr. 5, 2010), 3 pgs.

Kelley, "Introduction to Registry Filtering in Vista (Part I)", The NT Insider, vol. 15(1 ), [Online] retrieved from the internet: <http://www.osronline.com/article.cfm?article=517>, (May 28, 2008), 1-8.

Laing, Z, et al., "Isolated Program Execution: An Applicatio Transparent Approach for Executing Untrusted Programs", Proceedings of Annual Computer Security Applications Conference, (2003), 11 pgs.

U.S. Appl. No. 15/276,494, filed Sep. 26, 2016, Computer Security System and Method.

\* cited by examiner

COMPUTER SECURITY SYSTEM AND METHOD

CROSS REFERENCE TO RELATED APPLICATIONS

The present application is a continuation-in-part of U.S. patent application Ser. No. 15/276,494, filed Sep. 26, 2016, entitled "A COMPUTER SECURITY SYSTEM AND METHOD", which is a continuation of parent application Ser. No. 14/325,301, filed Jul. 7, 2014, entitled, "A COMPUTER SECURITY SYSTEM AND METHOD", which is a continuation-in-part of parent application Ser. No. 13/867,447, filed Apr. 22, 2013, now U.S. Pat. No. 8,775,802, entitled, "A COMPUTER SECURITY SYSTEM AND METHOD", which is a continuation-in-part of parent application Ser. No. 12/911,184, filed Oct. 25, 2010, now U.S. Pat. No. 8,429,429, entitled, "A COMPUTER SECURITY SYSTEM AND METHOD", which claims the benefit of U.S. provisional application No. 61/254,432, filed Oct. 23, 2009, entitled, "A COMPUTER SECURITY SYSTEM AND METHOD", all of which are herein incorporated by reference.

BACKGROUND

Computer security is becoming an increasingly important issue as more and more reliance is placed on computers to manage important information. The increasing threat of viruses has required that systems provide adequate protection against both known and unknown threats.

The present system and method for providing computer security relate primarily to the Microsoft Windows®-based operating system platforms, including, but not limited to, Windows XP,® Windows Vista,® Windows 7,® Windows 8,® Windows 10,® Windows Server 2008,® Windows Server 2012,® and Windows 2016,® which are tied to the Intel,® Itanium, and AMD® processors with an Intel 8086®-based or RISC-based instruction set, register, and memory configurations. The present system and method particularly relate to both the 32-bit and the 64-bit versions of these operating systems in which more robust features are provided. However, the principles established herein are do not specifically require Windows or the specific hardware platforms noted above, and the invention is not to be construed as so limiting. Numerous other embodiments are contemplated.

In the 32-bit Windows architectures, an application running in user-mode can chain (patch) into a system call table via a known user-mode application program interface (API). The problem with this approach is that a malicious application can chain into the system call table and from there easily infect almost any part of the system.

In the 64-bit version of Windows, a feature called the Kernel Patch Protection (KPP), (informally known as "PatchGuard") was implemented that does not allow alteration of the operating system code itself, making the system more secure and less vulnerable to malicious code. However, since some useful programs rely on patching the OS in order to work properly, these applications do not work on the 64-bit version.

For both the 32-bit and the 64-bit versions of Windows, anti-virus and anti-spyware software is needed, since it is possible to install programs that can give an attacker access to, and control over, the system, merely by clicking on a link in an e-mail or by visiting a malicious website containing malware.

Conventional anti-virus and anti-malware software relies on signatures, or specific attributes of malware to detect viruses and malware and to defend against them. Such signatures could be, e.g., a specific series of instructions or a data field that is consistent across copies of the virus payload. However, new so-called "polymorphic" and automatically self-modifying malware can get around these protections by changing their signature dynamically. Criminal enterprises have formed and are currently using these techniques to invade Windows-based systems and steal passwords and account information; in some cases such techniques have been used to steal hundreds of thousands of dollars using online banking credentials that were stolen.

Furthermore, the zero-day problem also negates signature-based anti-virus and anti-malware solutions. The zero-day problem is the day on which a virus or malicious software is first introduced into the general population. On the first day, no analysis has been performed on the threat and no potential signatures have been identified and provided in the anti-virus program databases.

Previous attempts to protect against this sort of malware have been based on a separate area of memory or physical disk where all changes to the system are recorded and mapped to the "actual" files, so that changes are not committed to the actual system files, but rather the temporary image of those files. However, these systems have significant limitations in their ability to function, and some cannot function at all on the 64-bit platform because of their reliance on using routines that can be considered security risks.

What is needed is a kernel-mode product for both 32-bit and 64-bit Windows platforms which allows users to selectively isolate processes from sensitive areas in the operating system. The important components that are protected through isolation may include the file system, the system registry, named pipe and mail slot access, socket-based connections, and port-communications, Port based accesses may be filtered for isolated processes. The actions which isolated processes can perform over these ports, such as asking the caller about the connections, not registering any ports which can be used for call back from the outside, etc. can be provided as well.

SUMMARY

The following acronyms are used in this application.

Table of Acronyms

ACE Access Control Entry (a Microsoft-defined protection mechanism)
AMD Advanced Micro Devices (company)
API application program interface
CM configuration manager
DACL discretionary access control list
FAT file allocation table (older file system for Microsoft Windows)
FS file system
FSD file system driver
GUID globally unique identifier
IO or input/output
I/O
KPP Kernel Patch Protection (Microsoft Windows 64-bit version feature, informally known as "PatchGuard")
LPC local procedure call
MSDN Microsoft Developer's Network
NPFS named pipe file system NTFS (Windows) NT file system
PDF Portable Document Format (defined by Adobe)
RAM random-access memory
RFM Registry Filtering Model (defined by Microsoft Windows)
RISC reduced instruction set computer
ROM read-only memory
RPC remote procedure call
SSDT System Service Descriptor Table (defined by Microsoft Windows)

Based on the above background discussion, and in accordance with various embodiments of the invention discussed in more detail below, a method is provided for protecting a computer system, comprising attaching a security descriptor to a process running on a processor of the computer system that has been previously started. An isolation indicator is associated with the security descriptor that, by the isolation indicator itself, indicates the process is running in an isolation mode, thereby rendering the process as an isolated process. The isolated process may run with a plurality of non-isolated processes in a common environment.

A kernel routine may be called by the isolated process that is also callable by a non-isolated process that is not running in isolation mode, the non-isolated process being among the plurality of non-isolated processes. When the kernel routine is called by the isolated process that is attempting to perform an operation on an object, the method determines, by a filter driver running in kernel mode, whether the kernel routine is requesting the operation on behalf of the isolated process or the non-isolated process. If the operation is requested on behalf of the isolated process, then the process performs the operation utilizing a pseudo storage area. If the operation is requested on behalf of the non-isolated process, then the process performs the operation utilizing an actual storage area in which the object of the computer system resides.

An indication is provided, for resources associated with the operation in the pseudo storage area, to restrict access to solely from within the isolated process, and access to the resources is restricted to being solely from within the isolated process based on the indication.

The present system may be active at any place the software interfaces to the operating system.

DESCRIPTION OF THE DRAWINGS

Various embodiments of the invention are illustrated in the Figures and following descriptive text.

DETAILED DESCRIPTION

The security system and method are implemented by software algorithms that run on a computer system to be protected. Various embodiments of the invention are described below.

Figure 1:
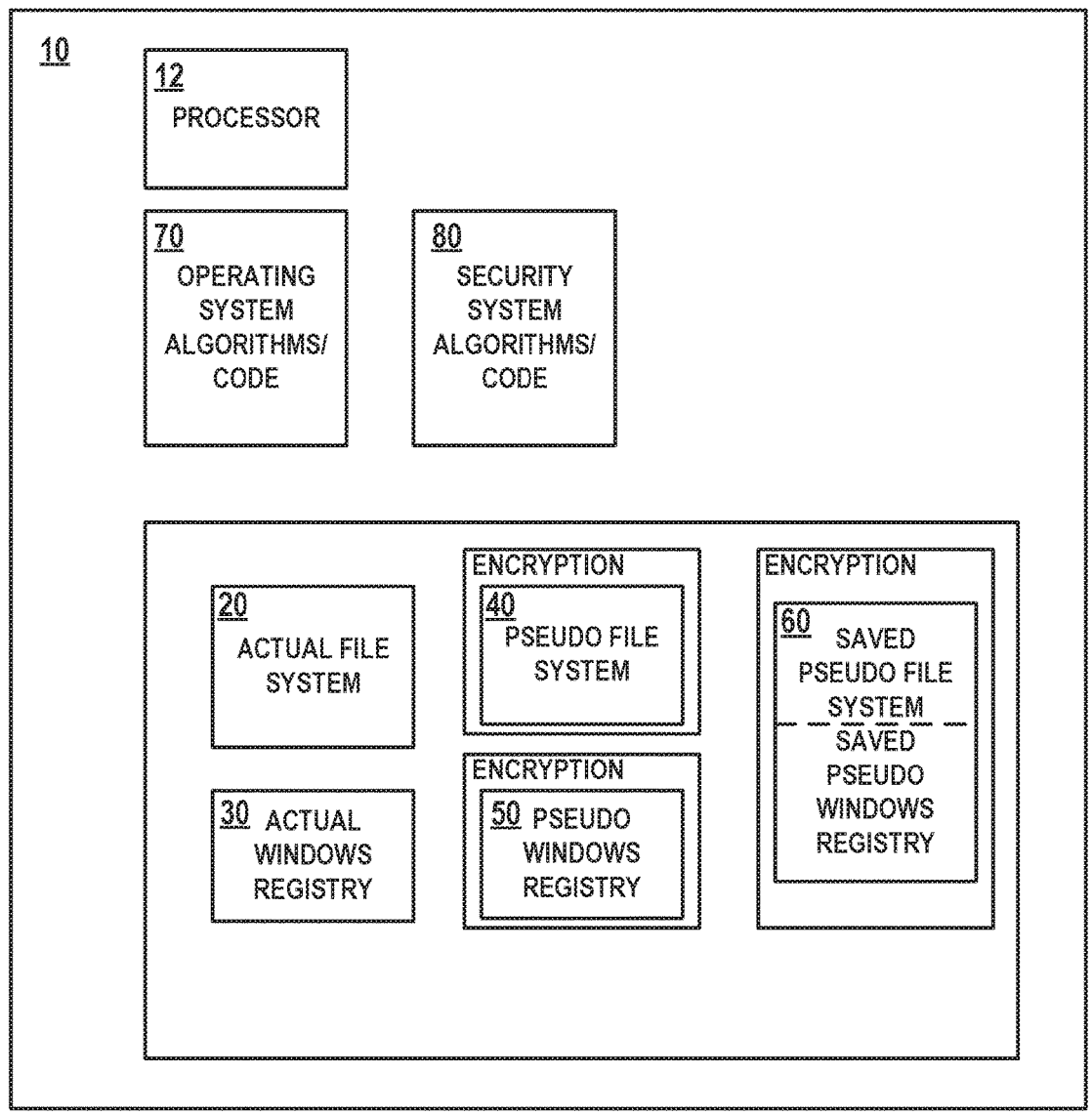
FIG. 1 is a block diagram illustrating the primary components of the system.

FIG. 1 is a block diagram of a computer system 10 on which the security system software is run. The computer system 10 may comprise elements typical of a computer, such as volatile and non-volatile memory, storage devices, such as hard drives, communications and network hardware/software, user interface devices, such as a display, keyboard, mouse, etc.

The computer 10 has an actual file system 20 that is provided on a non-volatile storage device, such as a hard drive or non-volatile writable memory. The file system 20 also includes the necessary hardware and software (as part of the operating system code 70) for providing organized read and write access of information typically organized into files and directories. In the Microsoft Windows operating system, an actual Windows Registry 30 is provided that is used to store important system information.

On operating systems that do not use a form of registry, the discussion below related to the registry can be ignored, although any equivalent functionality implemented through the file system would still be applicable.

As described in more detail below, the security system code 80 distinguishes between processes that are to run normally 90 and those that are to run in an isolated mode (isolated processes) 95. Isolated processes 95 will generally interact with a pseudo (or shadow) file system 40 and a pseudo windows registry 50 unless read only access is used by the process 95. The pseudo file system 40 and a pseudo windows registry 50 are preferably implemented on the non-volatile storage medium of the computer 10, but could also be implemented in volatile memory as well, although with many large file accesses, the amount of available volatile memory may be limiting. The data created with an isolated process 95 may be stored in a saved pseudo file system and saved pseudo windows registry 60 so that it can be further utilized by a later instance of the isolated process 95.

When the security software 80 is first installed on a computer, a list of executable file names and/or processes that are to be isolated 35 are loaded into the Windows Registry 30 (or possibly in a system file). This list identifies applications and process names that may result in compromised data and executable files to be loaded onto the computer 10. An example would be web browser software, such as Microsoft's Internet Explorer, Mozilla's Firefox, or Google Chrome. The list can be easily updated manually or automatically so that the code 80 can modify the processes that it treats as isolated processes. This list could vary depending on the username or a user/group attribute. For example, a user with administrative privileges on the computer 10 might be able to run the browser with write access to the actual file system 20, whereas a non-privileged user may be restricted as described herein. Or, the isolation could be provided for all process of a particular user or user/group attribute. The system software 80, in the form of a driver, then subsequently reads this list when the driver is loaded.

An isolated process is allowed read-only access to the actual file system 20 and registry 30, however any changes that it attempts to make are redirected to the pseudo file system 40 and registry 50.

FIGS. 2A-D illustrate various steps that are used for process creation 100, process read/write 200, and process termination 300.

Figure 2A:
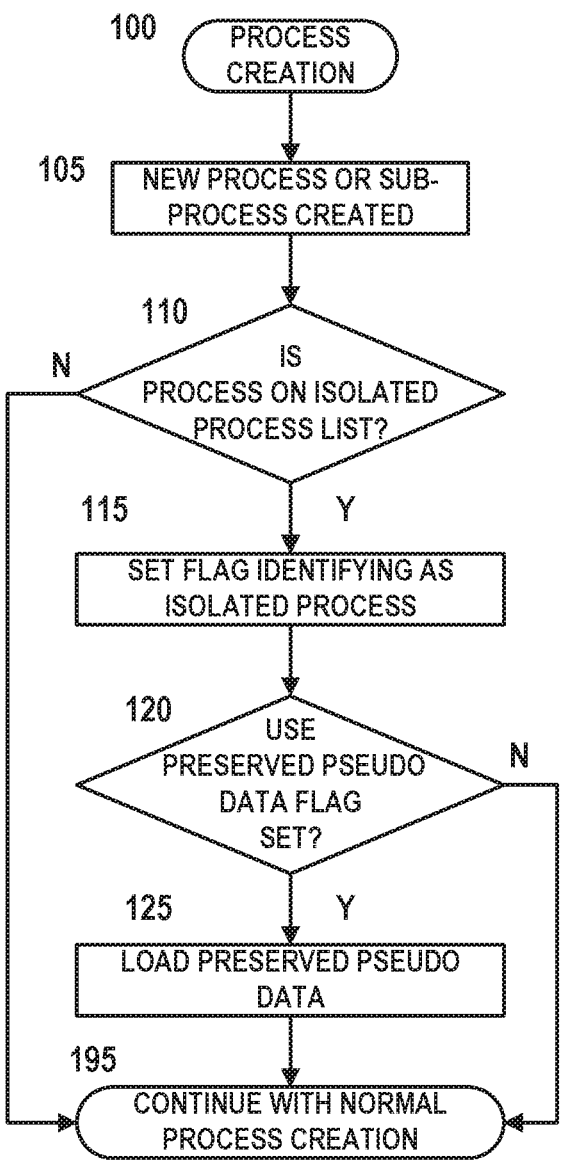
FIG. 2A is a flowchart illustrating a method for process creation.

FIG. 2A illustrates process creation 100. In the following example, Microsoft's Internet Explorer, a web browser ("browser"), is used as an exemplary process that is to be isolated—however, it should be understood that the process can be used for any application.

When a user initiates a browser instance, the operating system creates a new instance of a browser process iexplore.exe 105. The software 80 has a process creation callback, so whenever a new process gets created on the system, the software 80 callback gets called, indicating that a new process is being created, the process ID, and the fact that it is a new process that's getting created.

The software 80 checks to see 110 if this process "iexplore.exe" is on the isolated process list 35. If it's not, the system continues on with the normal process creation routines 195. If it is, then the system sets a flag identifying this instance of the process as an isolated process 115. A data structure is created that indicates this as an isolated process Information about the location of the pseudo file system and registry is obtained at this point. The root location of these items are known ahead of time but a unique index value is assigned to the process group and that is the unique starting point for the pseudo file system and directory. By way of example (refer to FIG. 3, discussed in more detail below), process group 1 300 may have a pseudo file system 340 located at c:\User\Pete\VectorShield\Group1, whereas process group 2 400 may have a pseudo file system 440 starting at c:\User\Pete\VectorShield\Group2. In this way, multiple groups 300, 400 can be running in parallel and not interfere with each other.

In addition, if the process being created is a sub-process of an isolated process, the sub process is also flagged as an isolated process, since a sub-process of an isolated process should be subject to the same write restrictions of the isolated process. The detection of processes within an isolated process group may use the Microsoft's Access Control Entry (ACE) inheritance model (see MSDN (Microsoft Developer's Network) Library, Access Control Model, (and associated subchapters) build date Sep. 30, 2010).

For system processes which perform work on behalf of an isolated process, a special discretionary access control list (DACL) may be attached to a token of the isolated process. The DACL is an access control list that is controlled by the owner of an object and that specifies the access particular users or groups can have to the object. The isolated object's token can be passed through the system and provides an identifiable flag to the filter driver that a particular server request should in fact be isolated.

Figure 3:
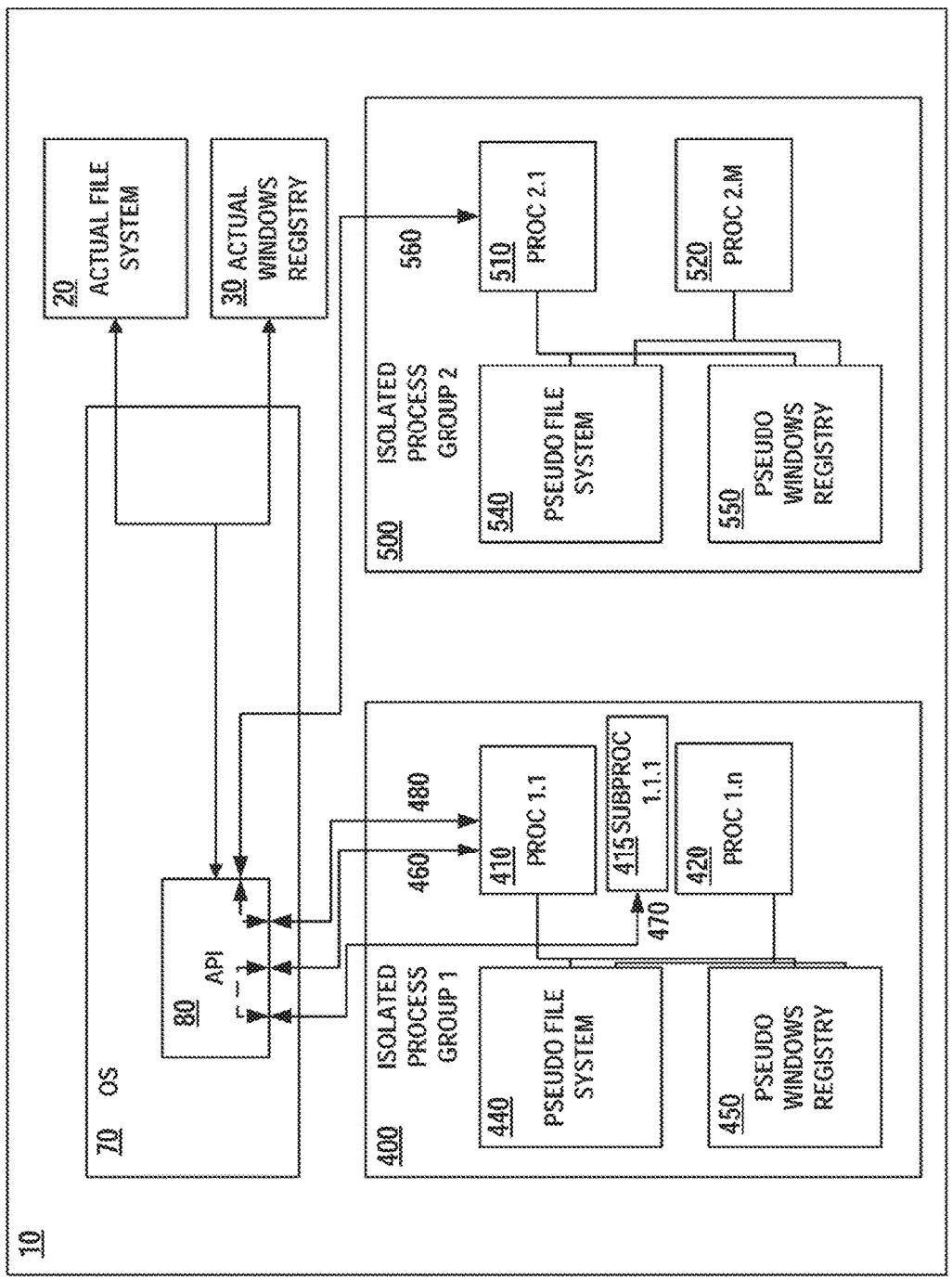
FIG. 3 is a block diagram illustrating a system with two isolated process groups.

A handle duplication and inheritance subsystem within the system may be filtered by registering with system APIs. Isolated processes can be organized into process groups. Referring to FIG. 3, isolated process group 1 400 comprises a number of processes: process 1.1 410, and process 1.n 420. Furthermore, a subprocess 1.1.1 415 may be created by process 1.1 410. Similarly, isolated process group 2 500 comprises a number of processes: process 2.1 410, and process 2.m 520. Processes 410, 415, and 420 in process group 1 400 can read and write from a pseudo file system 440 and pseudo Windows registry 450, and processes 510 and 520 in process group 2 500 can read and write from a pseudo file system 540 and pseudo Windows registry 550.

Handle inheritance and duplication within an isolated process group (e.g., within group 1 400) is supported and allowed. In FIG. 3, a process 1.1 410 creating a subprocess 1.1.1 415 can call 460 an API 80 of the operating system 70 that permits the inheritance and duplication of the handle 470. The API 80 is aware that the process 1.1 410 is in the same process group 400 as the subprocess 1.1.1 415. Although the within-group handle inheritance and duplication are described above with regard to a process and subprocess, it works in a similar manner between processes at the same level (e.g., proc. 1.1 and proc 1.n).

In contrast, handle inheritance and duplication across an isolated process group boundary (e.g., between group 1 400 and group 2 500) is adjusted via the API 80 480, 560 to remove any access which could allow an isolated process to modify, control, or terminate a non-isolated processes memory or functionality.

The handle inheritance and duplication filtering is performed on a per process and per thread basis to eliminate any possibility that an isolated process group can modify, control or terminate a process or thread which is not isolated. Handle inheritance and duplication from non-isolated process groups modifying an isolated process groups process or thread is also restricted in the same manner described above.

Registry isolation may be similarly implemented through a registry filter driver. This filter, like the file system filter, may use a token-based technique to recognize system processes which are operating on behalf of an isolated process. All modifications made by an isolated process are redirected so that no changes to the real registry can be made from within an isolated process.

In one embodiment, a user may have decided to preserve the pseudo data from a previous session. In this case, if a flag is set, the software 80 then loads 125 the preserved pseudo data 60 into the pseudo file system 40 and registry 50. Then, normal process creation is carried out 195. Alternately, a similar operation could take place not with data preserved from a previous session, but from pre-canned data associated with a particular process to be isolated. For example, it may be desirable to have a browser with pre-canned PDF viewing software already present so that the user does not have to download it even the first time. It is preferable that each process group has its own pseudo file system and registry storage so that they cannot overlap.

Figure 2B:
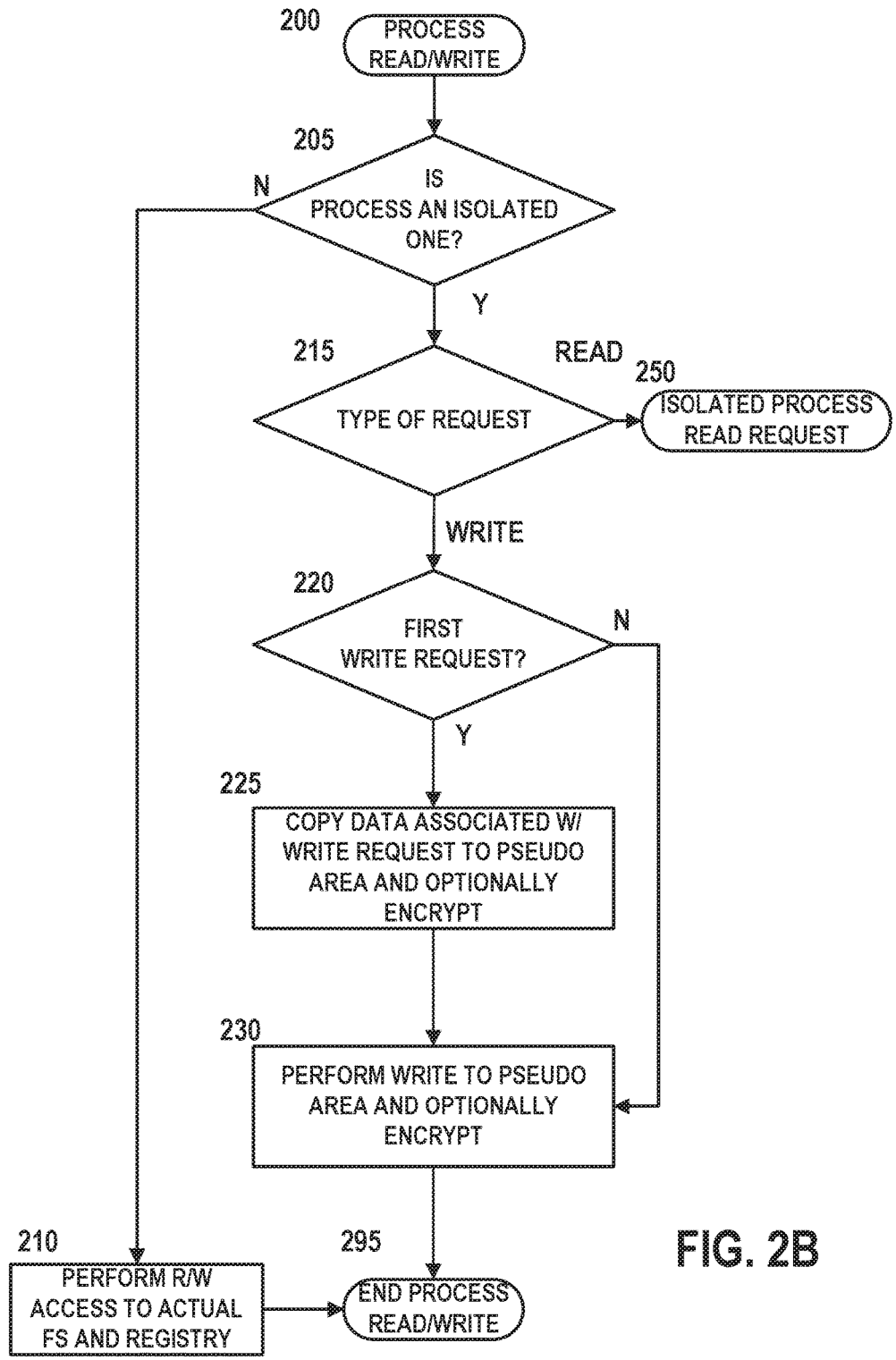
FIGS. 2B & C are a flowchart illustrating a method for process reading and writing.
Figure 2C:
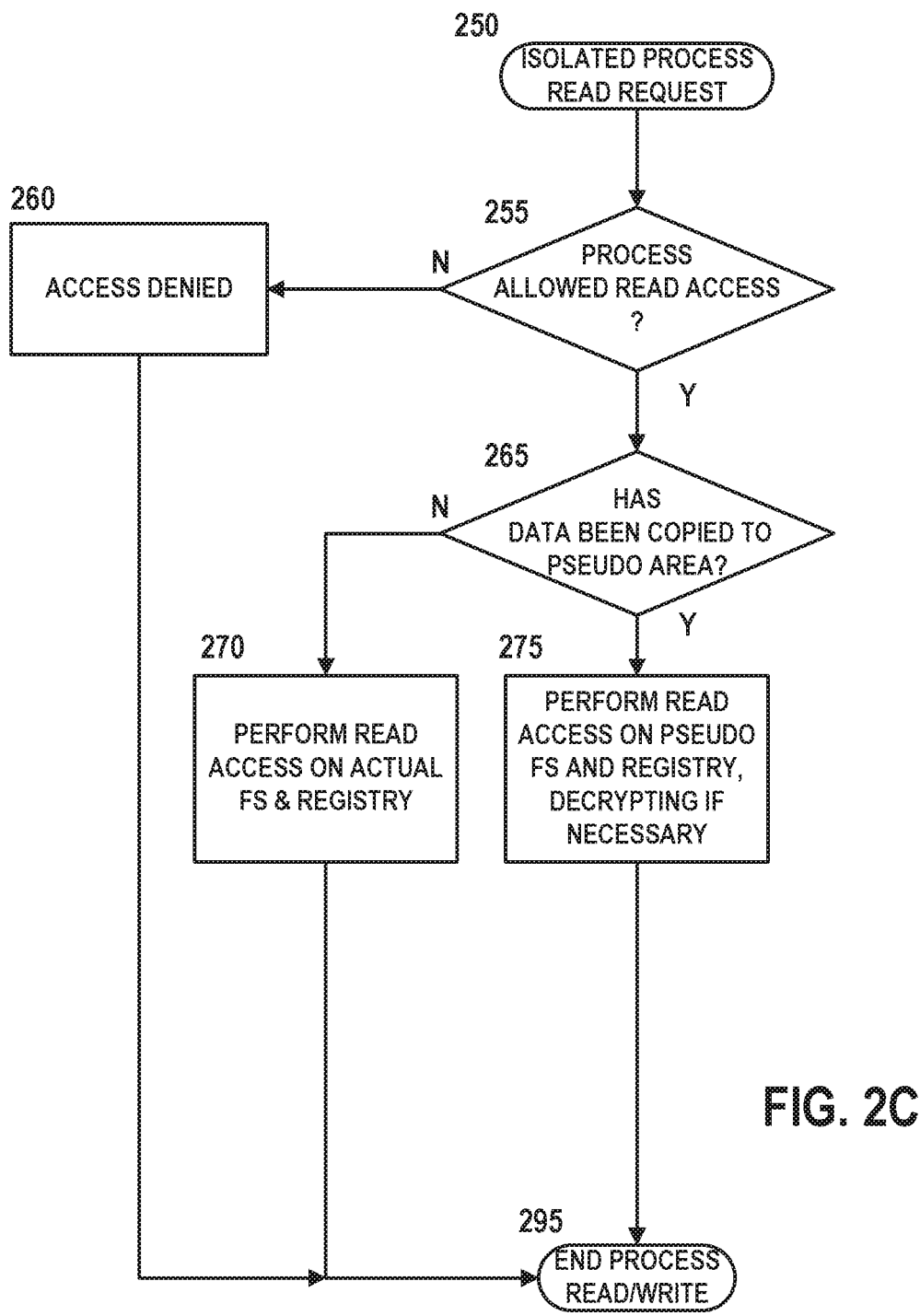
FIG. 2D is a flowchart illustrating a method for process termination.

FIG. 2B illustrates the process read/write procedure 200. When a process requests read or write access to the registry or file system, a test is performed to determine if the process is an isolated one 205, which may be done by checking the isolated process flag. If the process is not an isolated one, then the requested read/write access is performed normally 210, and the process read/write routine ends normally 295.

The handling of the request for an isolated process depends on whether the request is a read request or a write request. The software 80 determines the type of request 215. If it is a write request, then the software 80 determines if this is the first write request for this particular data 220. If it is, then the data associated with the write request is copied 225 from the actual file system 20 or registry 30 into the pseudo file system 40 or registry 50 respectively.

For file system requests, in one embodiment, the entire file is copied, and all subsequent read/write operations performed on the file are done in the pseudo file system 50 file. However, for large files, this may significantly slow down the initial write request. Therefore, in an embodiment, only some portion of the file is copied over, based on some predefined size. For example, the first write request on a file may trigger the copying of a 10 MB data chunk of the file to the pseudo file system 40. Any subsequent read/write operations within that 10 MB chunk of the file take place from/to the pseudo file system 40, whereas subsequent read operations outside of that 10 MB chunk take place from the actual file system 20.

The data is subsequently written to either the pseudo file system 40 or the pseudo registry 50. In one embodiment, the data is encrypted before it is written to the pseudo file system 40 or pseudo Windows Registry. This can prevent, e.g., malicious code that is downloaded with the browser, from being accessed by non-isolated processes. It is also possible to make the encryption as a selectable option. This provides an ability to control an isolated application's access to the "real" computer—i.e., encrypting the "pseudo" machine prevents it from seeing the real machine and vice versa, thereby thwarting viruses that might compromise users' passwords, contact list, and other private information. This design defeats a fundamental access mechanism a criminal hacker would try to use to gain access to a user's system. In addition to isolating the process, and the workspace, it also effectively "hides" the computer from assault.

For an isolated process read request 250 (FIG. 2C), in one embodiment, a check is performed 255 to see if the isolated process is allowed the type of read access requested. For example, a browser application may attempt to access a user's e-mail contacts list. However, the contact list may be indicated as a type of read access that is not permitted by isolated processes. In such a situation, access to the desired data is denied 260 and the read/write process ends 295. An error message could be generated and returned to the calling process. The list of information that a particular isolated process may access (or, conversely, not access) can also be provided in the registry 30 or in a file on the file system 20 and provided when the software 80 is installed. This list could vary depending on a particular username or user/group attribute.

The list may include list of directories, a list of wildcard delimited filenames that, disk drives, etc. to which access should be denied (or allowed). The list could include system files, a My Documents folder, the Outlook address book, etc. In this manner, unauthorized reads can be prevented.

If read access is allowed for the isolated process, then a determination is made as to whether the data has actually been copied to the pseudo area 265 (via either a previous write operation, or a preloading of preserved data). If it has not, then read access is permitted 270 on the actual file system 20 and registry 30. If it has, then read access is only permitted on the pseudo file system 40 and registry. If the data was encrypted when written, it is then decrypted prior to being provided to the calling isolated process 95.

Figure 2D:
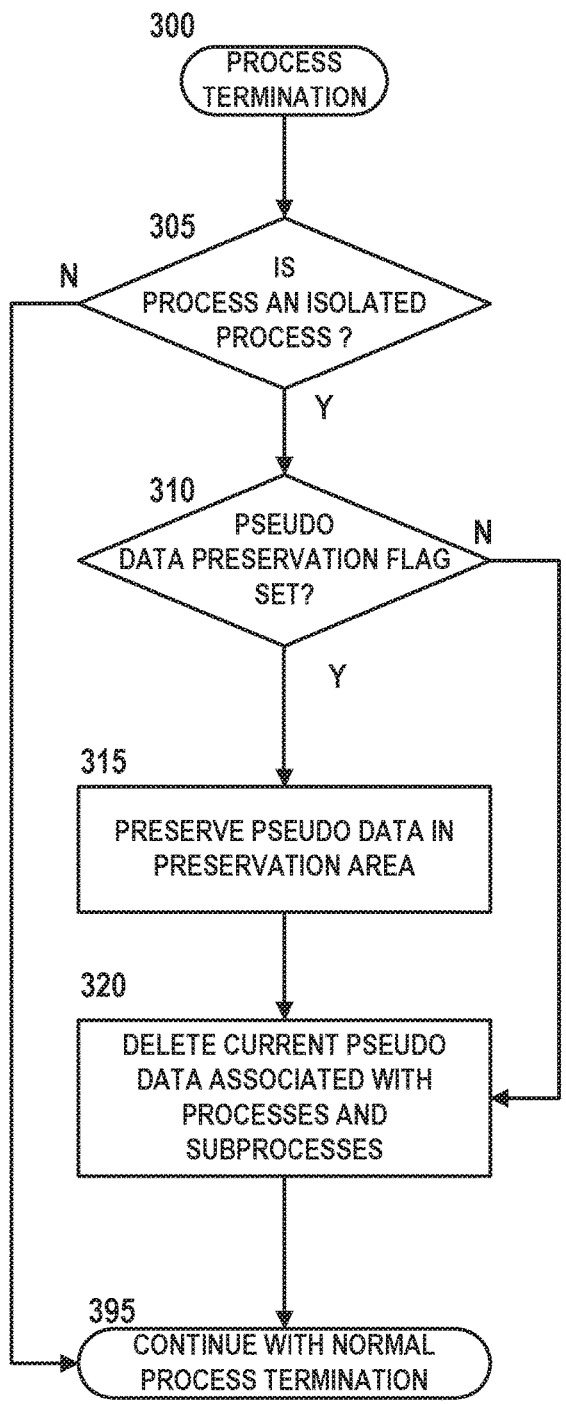

Process termination 300 is illustrated in FIG. 2D. In this embodiment, when a process terminates, the flag is checked 305 to determine if it is an isolated process 95. If it is not, then the system continues with normal process termination 395. If it is, a check is made to determine if a data preservation flag is set 310. Alternately, a user could be prompted to indicate whether the pseudo data should be preserved and made available for a subsequent instance of the application. If pseudo data preservation is indicated, then the pseudo data is preserved 315 in the preserved pseudo data storage area 60.

Subsequently, regardless of whether a choice was made to preserve the pseudo data or not, the current pseudo data associated with the terminating process (and any associated sub-processes) is deleted 320, and normal process termination 395 takes place.

It is also possible for the software 80 to determine if data has been compromised and then delete the preserved pseudo data 60 (or not allow preserving the pseudo data). Or, the user could be provided with an indication that the data has been compromised and ask if the user would still like to preserve or delete the preserved data. It may be possible to assess the risk threat detected by compromised data and take differing actions. For example, relatively benign adware downloaded on the system might not flag a deletion of preserved pseudo data 60, whereas a disk-destroying virus may require the deletion of preserved pseudo data 60—although such a virus poses no threat to non-isolated parts of the system, it could still harm data acquired within a session of a user executing isolated processes.

In one embodiment, the user may be asked whether to merge the pseudo data 40, 50 with the actual data 20, 30, although this option largely defeats its intended purpose, since a user is unlikely to know whether the pseudo data has been compromised or not.

In an embodiment, it is also possible to attempt to maintain integrity even within an isolated process or group of processes by utilizing encryption techniques at a low-level (e.g., socket communications, event processing, etc.) so that, e.g., a keystroke reading malware program downloaded via a web browser can not obtain, e.g., password information for a user accessing a bank account page. Preferably, this would be implemented via a kernel mode filter since this would be extremely difficult to thwart—however, this could also be handled in user mode, but a user mode implementation could be easier for a virus or malware to get around.

For Windows XP 32-bit and earlier Microsoft operating systems, accesses to the registry and file system can be implemented by the software 80 using a technique called "patching the kernel", which is an unsupported modification of the central component of Windows. In this scheme, for registry access, the Windows System Service Descriptor Table (SSDT) is opened, and all of the system application program interfaces (APIs) that perform registry access are identified. Then, for each interface, a patch is added that directs it to a routine of the software 80 that performs the requested registry access-either to the actual registry or to the pseudo registry. If necessary, the original access routine may be subsequently called, but this is often not necessary. Thus, a user mode process attempting to access a registry key via the kernel mode interface is actually accessing the patched registry access routines of the software. The Windows file I/O subsystem/APIs can be similarly patched so that file I/O requests are redirected to the software 80 routines.

The same mechanism cannot be used on Windows 64-bit platforms, due to Microsoft's implementation of Kernel Patch Protection (KPP), or PatchGuard, noted above. On this platform, any attempt to perform a patch to the descriptor table in this manner is detected by the OS, and causes the system to shut down. On Windows Vista and later versions of Microsoft's OSs, Microsoft's Registry Filtering Model (RFM) is utilized. This is described, in relevant part, in Jerry, Kelley, "Introduction to Registry Filtering in Vista (Part I), *The NT Insider*, Vol. 15, Issue 1, May 28, 2008).

The RFM provides a framework by which a driver can be developed that provides callbacks for registry 10 that it's interested in. These callbacks are registered with the RFM and are called whenever specific registry 10 is processed. All of the RFM interfaces that the driver uses are provided by the Configuration Manager (CM). In addition to managing the callbacks, the RFM also provides for three types of contexts that a driver can use to associate private information with an object or operation.

The software 80 implemented on 64-bit architectures comprise both a file system and a registry filter driver (although this model described below will also work on a 32-bit architecture). Those are actually two different binary modules in kernel mode. One of them is the file system which is a standalone full file system implementation. The other is a filter driver which actually registers with this RFM framework. Thus, the software registers various callback routines.

As registry access occurs from different processes in user mode, a respective callback is notified. For example, when a registry key is being opened, the callback routine is notified that an open on a specific key is happening, and receives its name, type of access that the user wants, etc. In isolated processes, such notifications are captured, and then redirect off to a virtual registry instead of allowing them to access the real registry.

File system isolation may be achieved through a file system filter driver which ensures that nothing in the underlying name space is modified by an isolated process. This may be implemented using Microsoft's Minifilter Driver architecture (see, MSDN File System Minifilter Drivers and subchapters, build date Sep. 28, 2010), which is a model for implementing file system filters. The presently implemented filter driver implements both the filtering for the file system and for the registry filtering.

Isolated processes go through a re-parsing in which filenames get reconstructed. By way of example, if the user in an isolated process wishes to access C:\foo.txt, when the file was created, the file system also created a named device object (see MSDN (Microsoft Developer's Network) Library, Named Device Objects, (and associated subchapters) build date Sep. 21, 2010). The name is reconstructed and then sent to that file system instance. A special status code is returned back to the system I/O manager. The I/O manager sees this status code and recognizes that a caller to redirect this open access, so it re-parses the name and it sends it over to the file system routines of the software 80. Thus, the software 80 leverages the Windows redirection functions.

The rebuilding of the filename and returning the special status code indicates that the I/O manager should re-parse the file name, and send the request to a location with a new name. In NTFS, directory and file symbolic links can be set. By way of example, if an isolated process attempted to write to c:\dir, this could be set as a re-parse point that actually points to e:\isolated_dir for the actual write, even though the process believes it is writing to c:\dir. So at the heart of the I/O manager, the redirection occurs, and the process is unaware that it has been redirected.

The isolation of a process preferably include named pipes, mail slots, remote procedure call (RPC), local procedure call (LPC), and sockets. All methods for modifying the environment can be handled to ensure complete isolation of the given process. In this implementation, channel access is monitored for an isolated process and appropriate action is taken depending on the type of access request is being made, the port on which it is to be performed, etc.

Named pipes may be filtered by using a legacy based filter driver attaching to the "Named Pipe File System", or NPFS. Named pipes are used for inter-process communication and this avenue for an isolated process group to leak information outside of the isolated process group is closed in an embodiment of the invention. The named pipe names are mangled such that inter-process communication within an isolated process group is supported but when named pipes are used for communication outside of the isolated process group they are blocked.

The pipe names are always mangled for isolated processes in the same manner. In contrast, pipe names for non-isolated processes are not mangled. Thus, for processes within a process group, their pipe names are mangled in the same way and thus they are oblivious to (or not aware of) the name mangling. But a process outside of the process group does not know about the name mangling and thus will not be able to access a named pipe opened by an isolated process. The same holds true for an isolated process attempting to open a named pipe created by a non-isolated process—the name opened by the isolated process would be mangled and thus would fail to open the non-isolated process named pipe.

Network sockets may be filtered within the kernel mode framework for isolated process groups to control how the isolated process group processes access networks resources. This is accomplished by using the kernel mode module for filtering socket creation and access. The determination of whether to allow connections to external network resources is mandated by policies setup during initial configuration of the system software.

Other network resources such as shared network storage, network printers and other resources shareable over a network connection should be denied access from within an isolated process group. File system access for system libraries may be controlled such that, for an isolated process group, any request to modify, delete, or overwrite a system library is denied. File system access control for system libraries may be implemented through a file system filter driver.

The Local Procedure Call, or LPC, interface may be controlled for isolated process groups. This control can be implemented through a filtering mechanism which utilizes the previously described security descriptor which is attached to isolated processes within an isolated process group. LPC requests for isolated process groups made to non-isolated processes are controlled or denied based upon the type of request made. A typical example which uses LPC communication is installer packages or any module which would need to be executed in a controlled environment. In this case, an LPC call is made to a system service to run a given application located at a specific location. In an embodiment of the invention, we can filter these LPC calls and modify the location of the executable which is to be executed.

The Remote Procedure Call, or RPC, interface may be controlled for isolated process groups. This control is implemented through a file system filter driver and any RPC request from an isolated process group is denied.

All requests which are isolated for a given process should be redirected to a name space, registry location, or necessary pseudo area for persistent storage. This storage can then later be used to launch the isolated process so that it can resume within the environment that it had previously modified. The user can be provided with the option at the time an isolated process ends to destroy all history of the process, allowing for a clean initialization the next time the process is launched.

One major challenge in the implementation was recognizing operations that are requested by isolated processes, yet are actually carried out inside of a server process. For example, certain file system accesses are sent from the original process through an LPC channel and the file system APIs are actually called by a server process such as csrss, lsass, svchost, etc.

When the file system filter sees these requests, it looks at the calling process and sees the server, not the client. However, the server is handling a combination of requests from both isolated and non-isolated processes and thus cannot be marked as isolated a priori.

A process-based recognition strategy is not enough to deal with these client-server cases. In order to ensure that a server process is not performing operations that are illegal for the client process, the client process passes its token along with the request. The server process then enters an impersonation mode where it takes on the identity and privileges of the client and is thus guaranteed to be limited to whatever the client itself would normally be allowed to access.

This token/impersonation scheme can be utilized by overloading some of the information within an isolated client process token. Every token has a DACL that enumerates pairings of access-type and identity to allow or disallow various rights to certain users. A special access control entry (ACE) can be added to this DACL which can then be recognized by the filter when it is handling requests coming from server processes.

The custom ACE that is built may be a concatenation of a special and specific globally unique identifier (GUID) (in order to avoid collisions with real user identities) and the process group that this particular application is a member of. For each request coming in to the filter, if it is not possible to determine the isolation status through normal process tracking, then the DACL can be scanned for this special ACE. If a matching ACE is found, the isolation process group is extracted and the request is treated as isolated. If no matching ACE is found then the request is treated as non-isolated. An additional benefit of using this strategy is that the process token is automatically inherited by new child processes. Therefore, the existing semantics of having all children of an isolated process remain isolated still hold.

A user mode DLL may be used for patching the import and export tables for isolated process groups. This user mode patching may be performed for 32- and 64-bit isolated processes. Note that this is different from attempting to patch kernel mode components to override specific functionality, which is prohibited in the Windows 64-bit operating systems. User mode binaries can be patched without problems on 32- and 64-bit systems, and patching user mode binaries is not restricted in the same manner as patching kernel mode components, and can be performed without problems.

The user mode patching allows for control of isolated processes from performing calls into system APIs which could allow the isolated process to modify, control or terminate a non-isolated process.

The APIs which are patched in the above user mode DLL include any which would allow the isolated process, or any process within the isolated process group, from opening a non-isolated process and accessing memory, handles, message queues, internal queues, window based frameworks or any additional access point which could allow the isolated process to modify, control or terminate the non-isolated process.

The above mechanism may also be used to control access for isolated process groups requesting COM requests to/from non-isolated processes.

The system is preferably implemented as a full-fledged file system such as NTFS or FAT—not an unnamed file system, hidden in Kernel Mode. Such a file system can thus provide the functionality described below.

The system provides isolation from and may be different in structure, access methods, and characteristics from NTFS and FAT. Preferably, the only commonality to NTFS and FAT is that they are file systems. NTFS and FAT talk directly to the disk, whereas the present file system should be a file system that talks to NTFS and FAT instead of talking to the disk. NTFS and FAT have a goal of data integrity, whereas the present goal is process isolation. Thus, the file system driver (FSD) is implemented to provide isolation for underlying files.

Thus, a file aspect is that normal utilities can work on a "pseudo" directory looking for signatures. A registry aspect provides that if one is not running inside of an isolated process—the keys can be seen, but they don't make any sense nor will they be in the right place to do something wrong or corrupt.

A process group can be created, which is a group of processes like the parent process and child processes that all have a consistent view of the system and its processes. Outside of this group, changes cannot be set that are made by the isolated processes. A process can be added to a process group, such as a scanner, and it could scan and see the changes. This would permit a clean pseudo file directory, which could then be merged back into the registry. Thus, it is possible to run everything isolated so that there is consistency in registry changes if committing the changes to the registry.

The registry filter is a Kernel model component that provides the registry isolation. The registry filter assures that registry changes are written to the pseudo registry area and not the actual registry area, and also redirects calls to the pseudo area so that system operates as though the changes had in fact been made to the registry. When a process launches, the filter intercepts references to the Kernel, and redirects to the pseudo area, for both write and read. Advantageously, this system has true redirection: if a key is being read it is going to the real registry. Thus, the present implementation sits above the file system and works on a registry key and value, and operates on a per file system basis, having a fine level of detail, permitting specific knowledge of what is happening to every single file.

Printing (both local and network) may be denied from protected sessions to eliminate possibilities of corrupting the system through malware attacks on this vector. The system can thus protect against a possible virus or malware introduced into e.g., the print spooler or other printer file/driver.

In an embodiment, printing might be allowed to PDF devices (i.e., printed to PDF files, which can possibly be stored outside of the virtual system, and these files can then be later printed). This protection can be implemented at install time or a run-time through configuration settings.

Other local resources (i.e., within the isolated process) can be protected as well, and this can be specified at the folder level, file level, file type level, etc. Preferably any of these restrictions can be set via configuration files at install time or at initialization time for the application.

The system can specify, for a protected session, that certain areas or certain resources are hidden from processes executing within the protected session, and specified local and network resources can be denied access from protected sessions. For example, when a process within a protected session requests to read something, even from within a protected session, a check is initially performed to determine if it is actually viewable, and if the process actually has access to it (even to the point of knowing whether the requested element exists). This is done so that malware, even though it cannot corrupt information outside of the protected session, cannot necessarily gain access to information, such as a user's address book, etc.

Local (i.e., within the isolated process and within the virtual space) resources, such as folders and file types, can be specified to be hidden/protected. Protected session applications are denied access (e.g., the system blocks attempts to perform reads/writes). For example, one can specify that the directory "My Documents" is a protected area, and thus, malware in a protected session would not be able to see or access information within the "My Documents" (or other specified) directory.

This could also be done at a specific file-level, extension level, and also by the use of wildcarding at any level (e.g., deny access to an address book by adding a *.adr template to a hidden resources list).

Although discussed at a file level above, this form of access restriction could take place for any type of I/O or resource (local disk, network disk, network, printer, other hardware device, etc.), and at any communication level (hardware accesses to high-level applications communications).

The list of these hidden resources can be specified at installation time via setup configuration files, or can be specified in loadable configuration files such as application initialization files so that the hiding of resources can take place dynamically. It can also be done in a group policy file, where such installations and/or configurations are taking place on many machines, such as within a corporate setting. The installation program could also contain intelligence such that it could determine, e.g., which email client is being used, and then restrict access based on the known address book format/extension for that particular client. This intelligence could be extended to any application or file type. It can indicate which processes within the protected session have what type of access to which resources.

By restricting these types of accesses within isolated processes, the system can prevent the spread of a virus within, e.g., corporate computers that might all share network drives and other networked resources, and thus prevent bringing down a company or a corporation's infrastructure.

The system can, in an embodiment automatically make a determination of a protected state when other instances of the same browser (or other applications) are currently running. This determination can be a sole/exclusive determination. The service can automatically assign a status as protected (unprotected) if a current instance of the same browser is already running that is protected (unprotected). This is handled in user mode. For example, if a protected Internet Explorer (IE) session is running, and the user starts another IE browser session, the system can presume that the user wants this to be protected as well. Conversely, if a non-protected IE session is running, and the user starts another IE browser session, the system can presume that the user does not want this to be protected. One option is to force all sessions or no sessions to be protected (this can be configurable).

When the system is running in a corporate setting, corporate rules can be established that dictate how computers within the corporation are run. One option is that the system is turned on or off in its entirety, i.e., either everything is protected or nothing is protected.

In one embodiment, a mechanism can be provided by which a user may recover a previously run session, i.e., there is some level of persistence for an isolated process/session. For example, if a session was run in which the user installed Adobe Acrobat Reader, instead of losing this install when the session is ended, the session information can be preserved so that a new session in which the browser is launched will retain the Acrobat Reader install. As long as a session has not been compromised or corrupted, there is no reason why a previous session cannot be maintained.

The session information can be stored in a file that can be reloadable either by the user's choice (the user is prompted to determine if a previously loaded session should be used) or by a system configuration option. The session information could be saved off into a shadow folder (i.e., an encrypted folder) and could include a session index value. When the session closes, the session index value can be returned.

In one embodiment, only the latest saved session would be used, which would result in relatively simple implementation and maintenance. In such a system, the user could be prompted to see if they wish to revert to their last session or not.

However, it is also possible that multiple sessions could be maintained, although this could significantly increase the complexity and usability of the system. Such a system could, if a user's preferred session became corrupted or infected and they were unaware of this, permit the user to go back to an earlier saved session that did not have the corruption/infection. In one embodiment, each new protected instance can be an evolution of the one before so that if the current one becomes corrupted, one could actually return to the previous session, without having previously intentionally saved it. Basically the ability to go back to a slightly earlier version, without having to go all the way back to some previously saved state, could be beneficial.

Items that could persist from an isolated session could include things such as (but not limited to): the shadow folder for the file system content that has been saved/modified, registry information, installed software, application configuration files and data (e.g., bookmarks for web browsers and browser configuration files, cookies, web site usernames/passwords, etc.). All of this can be indexed off of a session index value. As an example, a user launches an Internet Explorer session. The file system sends a request out to the user mode service to request whether or not that session is going to be isolated or not. A dialog pops up, and the user can indicate "yes" or "no". If the user says "yes", then the user service returns an index value back down to the kernel mode process, and then this is within the shadow folder for both the file system and registry as sort of a root directory that is created. Everything for the session can then be created underneath this root directory with that index value. When the session closes, all of this content is normally deleted (if it is not persisted). But when persisted, when the user opens a protected browser session and indicates a desire to return to the session, the content underneath this root directory is simply used again. This information is all encrypted, so it is not available outside of the protected session.

For systems in a public location and/or used by multiple users, it may not be desirable to allow this persistence, whereas a computer for a particular employee in a corporate setting, a liberal use of persistence might be allowed. Again, this can be dictated by configuration files, either at installation time, or initialization/run time.

In another embodiment, it is possible to provide a port without encryption (i.e., one that is not a part of the shadow disk) that serves as a port outside of the virtual world (the copy on write discussed above) in order to save this and/or any other information in clear/plain text and without encryption, such that it is accessible outside of the virtual world and even after the isolated process has ended. However, this also opens up the possibility of a security breach—it opens up a hole where product specific attacks could occur to circumvent the product. Therefore, the benefits of allowing this must be weighed against the risk. Some form of data/file filtering for this port could also be utilized (and specified via configuration files) as well, e.g., only text files or scrubbed PDF files can be sent (this would minimize the risk of transmitting a virus). Office-type files can be scrubbed for harmful macros, and other sorts of filtering/scrubbing could be utilized.

In an embodiment, a further application may be provided in which, periodically (e.g., every couple of seconds), a check is made to see if the user mode service, including the user interface process, is running (the user mode service can be killed, even though the system is protected by the kernel mode code), and if it is not, it is restarted. When the user interface restarts, it spins through all of the processes to determine which ones are running protected/isolated on the system by asking the kernel code about each of them. From this, it can rebuild the user mode service and reinitialize the user interface. As discussed above, an isolated process remains an isolated process throughout its life, and any sub-processes it creates are also isolated processes.

Figure 4:
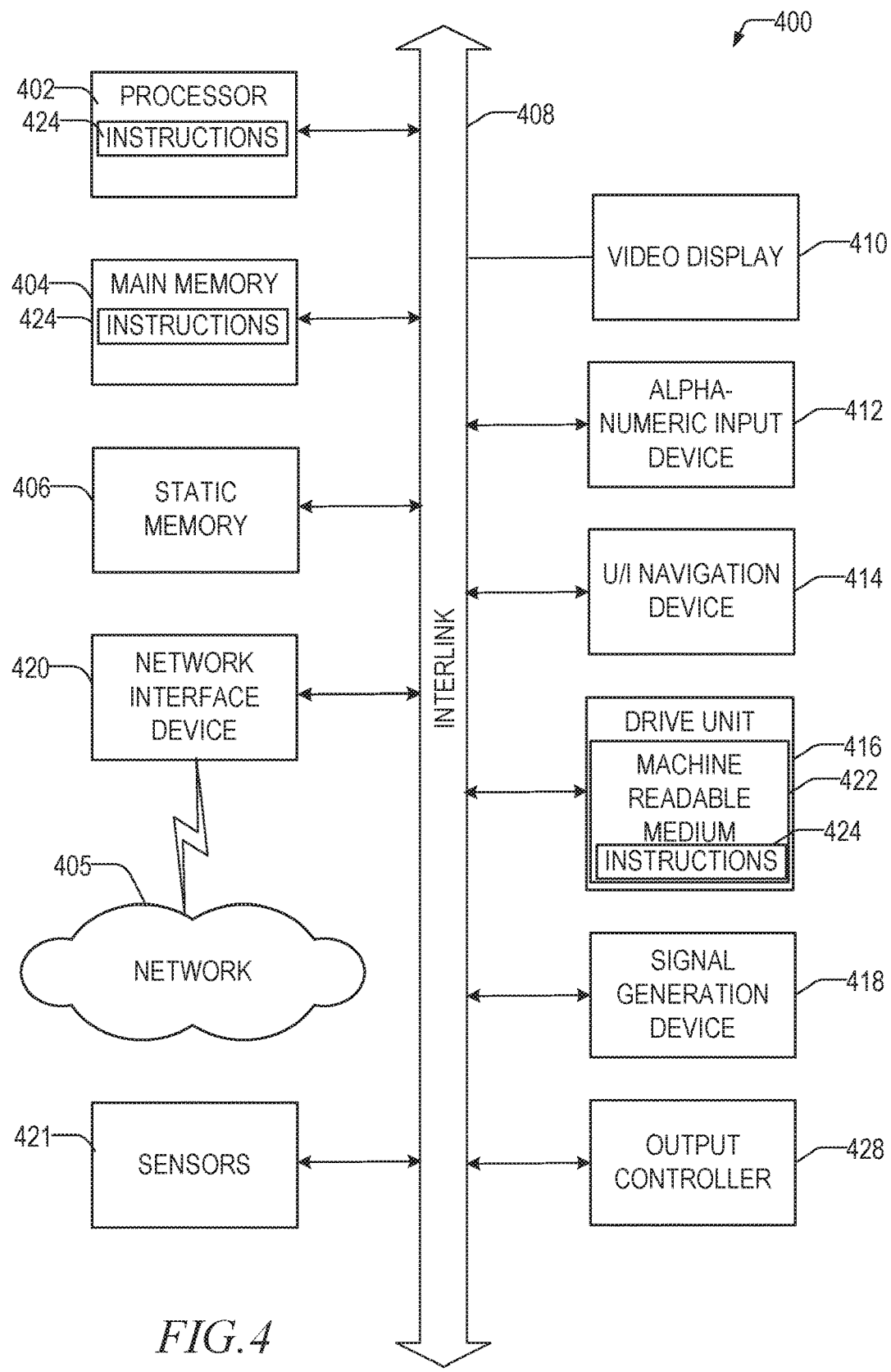
FIG. 4 is a block diagram illustrating a machine that may be a computer on which various processes described herein may be performed.

To describe some configurations in greater detail, reference is made to examples of hardware structures and interconnections usable in the designs of the present disclosure. FIG. 4 is a block diagram illustrating a machine that may be a computer on which various processes described herein may be performed, such as a processor of the system 10 described above. The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example described herein, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 424 may further be transmitted or received over the communications network 405 using a transmission medium via the network interface device 420. The term "transmission medium" is defined herein to include any medium that is capable of storing, encoding, or carrying instructions for execution by the machine, and includes digital or analog communications signals or other medium to facilitate communication of such software.

The machine 400 may communicate with one or more other machines 400 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 400. In an example, the network interface device 420 may include one or more physical jacks (e.g., Ethernet, coaxial, or phone jacks) or one or more antennas to connect to the communications network 426.

In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

A wide variety of computing devices may constitute a machine 400, as described herein. The following list includes a variety of devices that may fit the definition of a machine 400: a personal data assistant (PDA), a cellular telephone, including a smartphone, a tablet computing device, a laptop computer, a desktop computer, a workstation, a server computer, a mainframe computer, and the like.

Figure 5:
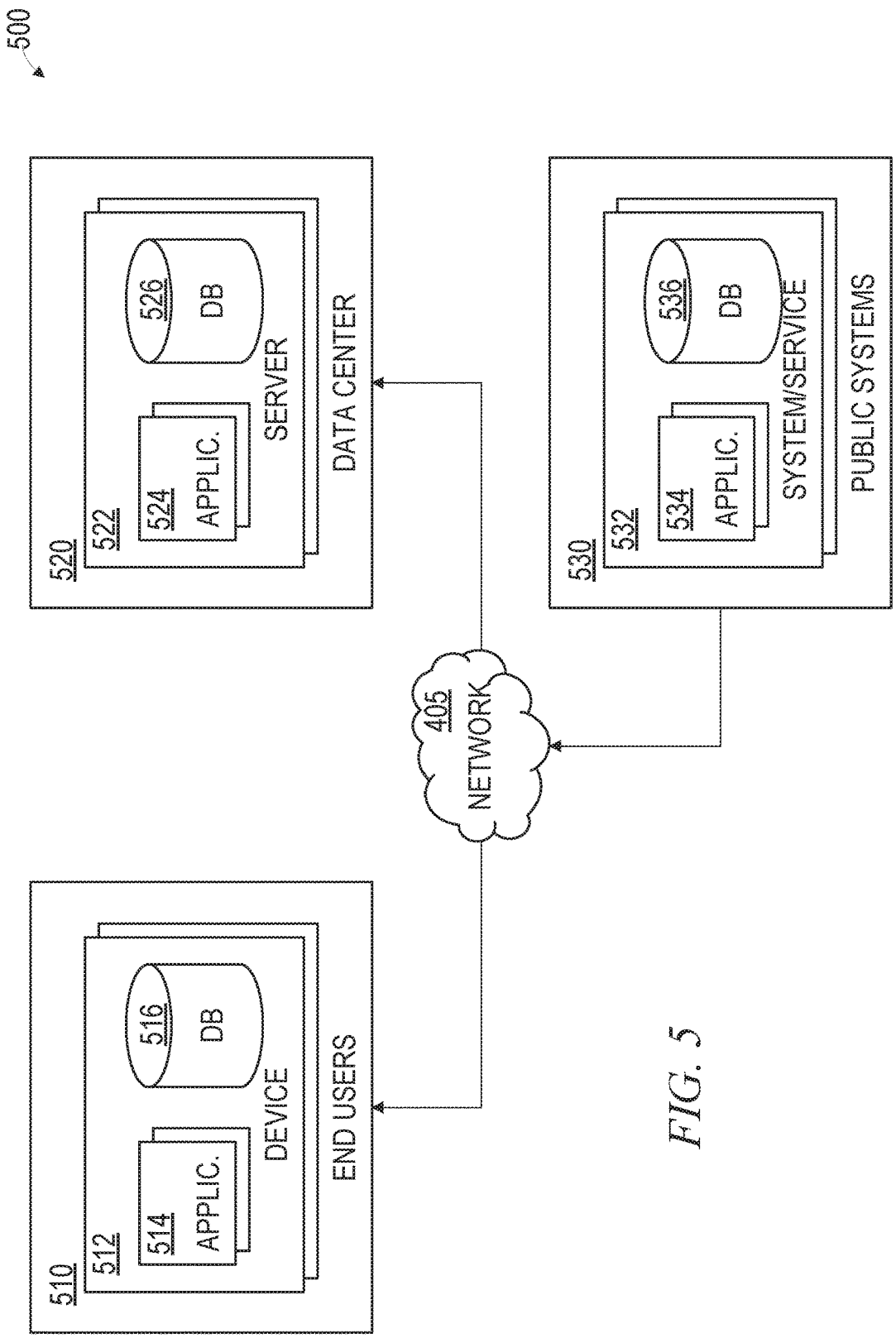
FIG. 5 is a block diagram of a distributed system that may include a client-server architecture or cloud computing system.

FIG. 5 is a block diagram of a distributed system 500 that may include a client-server architecture or cloud computing system. The system 500 may be a system 100 as described above. Distributed system 500 may have one or more end users 510. An end user 510 may have various computing devices 512, which may be machines 400 as described above. The end-user computing devices 512 may comprise applications 514 that are either designed to execute in a stand-alone manner, or interact with other applications 514 located on the device 512 or accessible via the network 405. These devices 512 may also comprise a data store 516 that holds data locally, the data being potentially accessible by the local applications 514 or by remote applications.

The system 500 may also include one or more data centers 520. A data center 520 may be a server 522 or the like associated with a business entity that an end user 510 may interact with. The business entity may be a computer service provider, as may be the case for a cloud services provider, or it may be a consumer product or service provider, such as a retailer. The data center 520 may comprise one or more applications 524 and databases 526 that are designed to interface with the applications 514 and databases 516 of end-user devices 512. Data centers 520 may represent facilities in different geographic locations where the servers 522 may be located. Each of the servers 522 may be in the form of a machine(s) 400.

The system 500 may also include publicly available systems 530 that comprise various systems or services 532, including applications 534 and their respective databases 536. Such applications 534 may include news and other information feeds, search engines, social media applications, and the like. The systems or services 532 may be provided as comprising a machine(s) 400.

The end-user devices 512, data center servers 522, and public systems or services 532 may be configured to connect with each other via the network 405, and access to the network by machines may be made via a common connection point or different connection points, e.g. a wireless connection point and a wired connection. Any combination of common or different connections points may be present, and any combination of wired and wireless connection points may be present as well. The network 405, end users 510, data centers 520, and public systems 530 may include network hardware such as routers, switches, load balancers and/or other network devices.

Other implementations of the system 500 are also possible. For example, devices other than the client devices 512 and servers 522 shown may be included in the system 500. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 522.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other aspects may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as aspects may feature a subset of said features. Further, aspects may include fewer features than those disclosed in a particular example. Thus, the following claims are hereby incorporated into the Detailed Description, with a claim standing on its own as a separate embodiment. The scope of the embodiments and aspects disclosed herein is to be determined with reference to the claims, along with the full scope of equivalents to which such claims are entitled.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A method for protecting a computer system, comprising:
   attaching a security descriptor to a process running on a processor of the computer system that has been previously started;
   associating with the security descriptor an isolation indicator that, by the isolation indicator itself, indicates the process is running in an isolation mode, thereby rendering the process as an isolated process, the isolated process running with a plurality of non-isolated processes in a common environment;
   calling a kernel routine by the isolated process that is also callable by a non-isolated process that is not running in isolation mode, the non-isolated process is among the plurality of non-isolated processes;
   attempting to perform an operation on an object by the kernel routine called by the isolated process;
   determining, by a filter driver running in kernel mode, whether the kernel routine is requesting the operation on behalf of the isolated process or the non-isolated process;
   when the operation is requested on behalf of the isolated process, performing the operation utilizing a pseudo storage area; and
   when the operation is requested on behalf of the non-isolated process, then performing the operation utilizing an actual storage area in which the object of the computer system resides;
   providing, for resources associated with the operation in the pseudo storage area, an indication to restrict access to solely from within the isolated process; and
   restricting the access to the resources to being solely from within the isolated process based on the indication.

2. The method according to claim 1, further comprising:
   restricting both local and network printing from within the isolated process.

3. The method according to claim 1, further comprising:
   allowing printing from within the isolated process only to a file.

4. The method according to claim 1, further comprising:
   assigning a protected status to a second instance of an application based solely on a protected status of a first instance of the application.

5. The method according to claim 1, further comprising:
   recovering information from a previously run isolated session and utilizing the recovered information in a subsequent isolated session.

6. The method according to claim 1, further comprising:
   providing a port for an isolated session via which information items from an isolated session can be communicated, the information items persisting for a next session after the isolated session has ended.

7. The method according to claim 1, further comprising:
   detecting if a user mode service is running;
   if the user mode service is not running, then restarting the user mode service;
   rebuilding a user interface for protected processes by inquiring from the kernel routine whether each process of the protected processes is protected or not.

8. A computer device for protecting a computer system, comprising:
   a memory, and a processor, the processor configured to:
   attach a security descriptor to a process running on the processor of the computer system that has been previously started;
   associate with the security descriptor an isolation indicator that, by the isolation indicator itself, indicates the process is running in an isolation mode, thereby rendering the process as an isolated process, the isolated process running with a plurality of non-isolated processes in a common environment;
   call a kernel routine by the isolated process that is also callable by a non-isolated process that is not running in isolation mode, the non-isolated process is among the plurality of non-isolated processes;
   attempt to perform an operation on an object by the kernel routine called by the isolated process;
   determine, by a filter driver running in kernel mode, whether the kernel routine is requesting the operation on behalf of the isolated process or the non-isolated process;
   when the operation is requested on behalf of the isolated process, perform the operation utilizing a pseudo storage area; and when the operation is requested on behalf of the non-isolated process, perform the operation utilizing an actual storage area in which the object of the computer system resides;
   provide, for resources associated with the operation in the pseudo storage area, an indication to restrict access to solely from within the isolated process; and
   restrict the access to the resources to being solely from within the isolated process based on the indication.

9. A method for protecting a computer system, comprising:
   calling a kernel routine by an isolated process that is also callable by a non-isolated process that is not running in an isolation mode, the non-isolated process is among the plurality of non-isolated processes;
   attempting to perform an operation on an object by the kernel routine called by the isolated process;
   determining, by a filter driver running in kernel mode, whether the kernel routine is requesting the operation on behalf of the isolated process or the non-isolated process;
   when the operation is requested on behalf of the isolated process, performing the operation utilizing a pseudo storage area; and when the operation is requested on behalf of the non-isolated process, then performing the operation utilizing an actual storage area in which the object of the computer system resides;

providing, for resources associated with the operation in the pseudo storage area, an indication to restrict access to solely from within the isolated process; and restricting the access to the resources to being solely from within the isolated process based on the indication.

* * * * *